US005268153A

United States Patent [19]

Muller

[11] Patent Number: 5,268,153

[45] Date of Patent: Dec. 7, 1993

[54] DISPENSER FOR SOLID-FORMED CHEMICALS

[75] Inventor: Edward J. Muller, Rutherford, N.J.

[73] Assignee: Sanolite Corporation, Brooklyn, N.Y.

[21] Appl. No.: 976,545

[22] Filed: Nov. 16, 1992

[51] Int. Cl.[5] .............................................. B01D 11/02

[52] U.S. Cl. .................................... 422/263; 422/266; 422/267; 422/282; 222/52; 222/318; 222/564

[58] Field of Search ............... 422/263, 264, 266, 267, 422/275, 282; 222/318, 521, 564; 239/317, 310, 314

[56] References Cited

U.S. PATENT DOCUMENTS

| | | | |
|---|---|---|---|
| 1,558,396 | 10/1925 | Roehrs | 222/564 |
| 2,895,649 | 7/1959 | Dawson | 222/318 |
| 3,419,360 | 12/1968 | Rak | 239/317 |
| 3,485,420 | 12/1969 | Lucas | 222/564 |
| 4,690,305 | 9/1987 | Copeland | 222/52 |
| 4,869,457 | 9/1989 | Ewerlof | 222/564 |
| 5,007,559 | 4/1991 | Young | 422/267 |

*Primary Examiner*—Robert J. Warden
*Assistant Examiner*—Hien Tran
*Attorney, Agent, or Firm*—Lerner, David, Littenberg, Krumholz & Mentlik

[57] ABSTRACT

An apparatus dispenses a solid-form chemical in the form of a dilute solution which is ready for immediate use. The apparatus supports a capsule of the solid chemical in an inverted position above a spray nozzle. A supply of solvent for the chemical is split into two portions, one of which is directed to the spray nozzle for spraying at the exposed surface of the solid chemical to form a concentrated solution of the chemical. The other portion of the solvent is directed to the outlet of the housing where it mixes with the concentrated chemical solution so that the solution is diluted to a desired concentration for use prior to being dispensed.

13 Claims, 5 Drawing Sheets

DISPENSER FOR SOLID-FORMED CHEMICALS

FIELD OF THE INVENTION

The present invention relates to the dispensing of chemicals which are supplied in solid form, and specifically in the form of a solid block. More particularly, the invention relates to contacting a solid block of a chemical with a solvent to dispense a solution of the chemical. Still more particularly, the invention relates to contacting a wash chemical supplied in solid block form with an aqueous liquid and dispensing a dilute solution of the wash chemical ready for use.

BACKGROUND OF THE INVENTION

To handle their varied washing needs, restaurants and other establishments having commercial kitchens typically are equipped with automatic dishwashers for handling the conventional flow of dishes, silverware and glassware. The facts that these machines handle relatively consistent loads, operate with a constant volume of water and are automated combine to make it relatively easy to accurately control the amount of wash chemicals these dishwashers use. Thus, through the use of sensors, flow regulators and other electronic devices, these machines can be set up to dispense wash chemicals, such as detergents, rinse aids and the like, in appropriate amounts to be effective without excessive use. As a result, these dishwashing machines enable the wash chemicals to be used in an efficient and economical manner.

Most commercial kitchens are also equipped with one or more sinks for manually washing small volumes of dishes and more cumbersome items such as pots and pans. The volume of the detergent solution required for such operations is typically determined by the size and quantity of the objects to be washed and the volume of the washing vessel. At times, the particular washing task may require that the sink be substantially filled with detergent solution, while at other times a much smaller volume of detergent solution may be needed.

In a typical manual washing operation, the amount of detergent used to form the washing solution is at the sole discretion of the operator. For example, the operator normally will place a quantity of detergent in the sink and then fill the sink with a desired volume of water. In many instances, the amount of detergent used will bear no relation to the volume of water added to the sink. As a result, the washing solution may contain too little detergent to clean properly or, as is more frequently the case, an excessive amount of detergent may be used than is necessary for the specific job. Thus, the very nature of these manual washing operations makes it difficult to control the amount of detergent and other wash chemicals consumed in these processes.

Attempts have been made in the past to add some degree of control to the quantity of wash chemicals used by the operators in these manual washing procedures. One approach designed specifically for dispensing liquid detergents employs a venturi-type proportioner to dispense the liquid detergent in a predetermined proportion relative to the fill water for the sink. In this device, as the fill water passes the liquid detergent dispenser it creates a certain level of vacuum which draws an appropriate amount of liquid detergent into the water flow—the faster the water flow, the more detergent is drawn in and the slower the water flow, the less detergent is drawn in so that the proportion of liquid detergent to fill water remains substantially constant.

Recent advances in the detergent industry have led to the development of solid wash chemical capsules consisting of a block of a wash chemical solidified within a jar or other container. Ease of handling, long shelf life, premium quality, uniform solubility and reduced shipping costs have caused these wash chemicals to become extremely popular. In order to dispense these solid chemicals, dispensing systems have been developed which spray a solvent, such as water, against the solid block, whether the block remains within its container or has been removed therefrom, to form a concentrated solution. The concentrated solution runs out of the dispenser into a reservoir or may be sent directly through a conduit for use in a dishwasher. When the chemical substance within the container has been completely dissolved, the dispenser can be recharged by simply removing the empty container and inserting a new container in its place. Dispensers of this type are disclosed in U.S. Pat. Nos. 4,687,121, 4,690,305 and 4,999,124 to Copeland, and U.S. Pat. Nos. 4,426,362 and 4,826,661 to Copeland et al.

The dispensers which heretofore have been available have dispensed these solid wash chemicals in the form of concentrated solutions which must be further diluted prior to use. Since these devices are usually used in connection with an automatic dishwashing machine, this ordinarily would not present a problem because, as noted above, it is relatively easy to accurately control the amount of wash chemicals used by automatic dishwashers. Problems arise, however, when these dispensers are used to dispense solid-form wash chemicals for use in manual washing operations. In this situation, an operator can fill a sink or other receptacle with as much of the concentrated wash chemical solution as desired and may or may not dilute the concentrated solution with additional water prior to use. Even when the operator does so dilute the concentrated solution, the lack of control makes it difficult to assure that the right amount of water has been added to dilute the concentrated solution to an appropriate use concentration. As a result of these difficulties, businesses which employ solid wash chemicals in manual washing operations are unable to accurately predict the rate at which these wash chemicals are being used and therefore encounter problems maintaining an adequate inventory of these chemicals. More importantly, since the concentration of the solution will affect cleaning performance, the inability to effectively control solid chemical use makes it difficult to obtain optimum cleaning.

In an attempt to better control the amount of concentrated solution dispensed by these devices, efforts have been made to incorporate timers into the devices to limit the dispensing cycle. The cost of these timers, the unavailability of electricity and the need for frequent maintenance have made this approach less than desirable. Moreover, since the operator can actuate the timer as often as he pleases while a receptacle is being filled, this approach effectively provides no control of chemical use at all. Further, these timers frequently are set up so that once actuated they fill the entire wash vessel with a fixed amount of solution, and therefore often dispense more solution than is needed for smaller washing jobs. Hence, the detergent industry has generally failed to provide an effective and inexpensive solution to the problem of controlling the dispensing of solid-form wash chemicals and, more particularly, the dispensing of these chemicals in a concentration which is ready for use.

There therefore exists a need for a dispensing device which is capable of controlling the use of solid-form wash chemicals so that solutions having a desired concentration for use can be provided on a consistent basis. Preferably, such dispenser will dispense a dilute solution of the wash chemical which is ready for immediate use without any further adjustment in concentration.

SUMMARY OF THE INVENTION

The present invention addresses these needs.

One aspect of the present invention provides a dispenser for dispensing a chemical solution consisting of a housing having support means for supporting a chemical in solid form, a dispensing outlet and a collector portion interposed between the support means and the dispensing outlet. The dispenser further includes supply means for supplying a solvent for the chemical to the housing and spray means for directing a spray of the solvent at the chemical. As the solvent is supplied to the housing, first conduit means direct a first portion of the solvent to flow from the supply means to the spray means, and second conduit means direct a second portion of the solvent to flow from the supply means to the dispensing outlet. Control means are provided for controlling the flow of the solvent through the first and second conduit means. The control means preferably includes valve means for simultaneously controlling the flow of the solvent through the first and second conduit means.

Preferred embodiments of the dispenser also include flow restriction means which cooperates with the first conduit means to restrict the flow of the first portion of the solvent from the supply means to the spray means. Preferably, the flow restriction means consists of a restricting member which defines an aperture having a fixed diameter which is less than the diameter of the first conduit means.

In a highly preferred embodiment, the support means supports the chemical in a container. In this embodiment, the dispenser further includes safety valve means for terminating the flow of the first portion of the solvent from the supply means to the spray means when the support means is not supporting a container of the chemical.

Another aspect of the present invention provides a method for dispensing a chemical solution in a predetermined concentration which is ready for immediate use. A method according to this aspect of the invention includes the steps of providing a chemical in solid form, supplying a solvent for the chemical and spraying a first portion of the solvent at the chemical to form a concentrated solution of the chemical and the solvent. The method further includes the step of combining the concentrated solution with a second portion of the solvent to dilute the concentrated solution to a use concentration prior to dispensing.

In preferred methods, the step of supplying the solvent includes the steps of defining a first flow path for the first portion of the solvent and defining a second flow path for the second portion of the solvent. A plurality of restricting members may be provided, each member defining an aperture having a fixed diameter different than the fixed diameters of the other members. One of these restricting members may be selected and interposed in the first flow path to thereby control the flow of the first portion of the solvent during the spraying step.

Accordingly, it will be appreciated that in accordance with the various aspects of the present invention, an improved method for dispensing a chemical solution and an apparatus therefor are provided which enable chemical solutions to be diluted prior to dispensing so that the chemical solutions are ready for immediate use.

BRIEF DESCRIPTION OF THE DRAWINGS

A more complete appreciation of the subject matter of the present invention and the various advantages thereof can be realized by reference to the following detailed description, in which reference is made to the accompanying drawings in which.

DETAILED DESCRIPTION OF A PREFERRED EMBODIMENT

Figure 1:
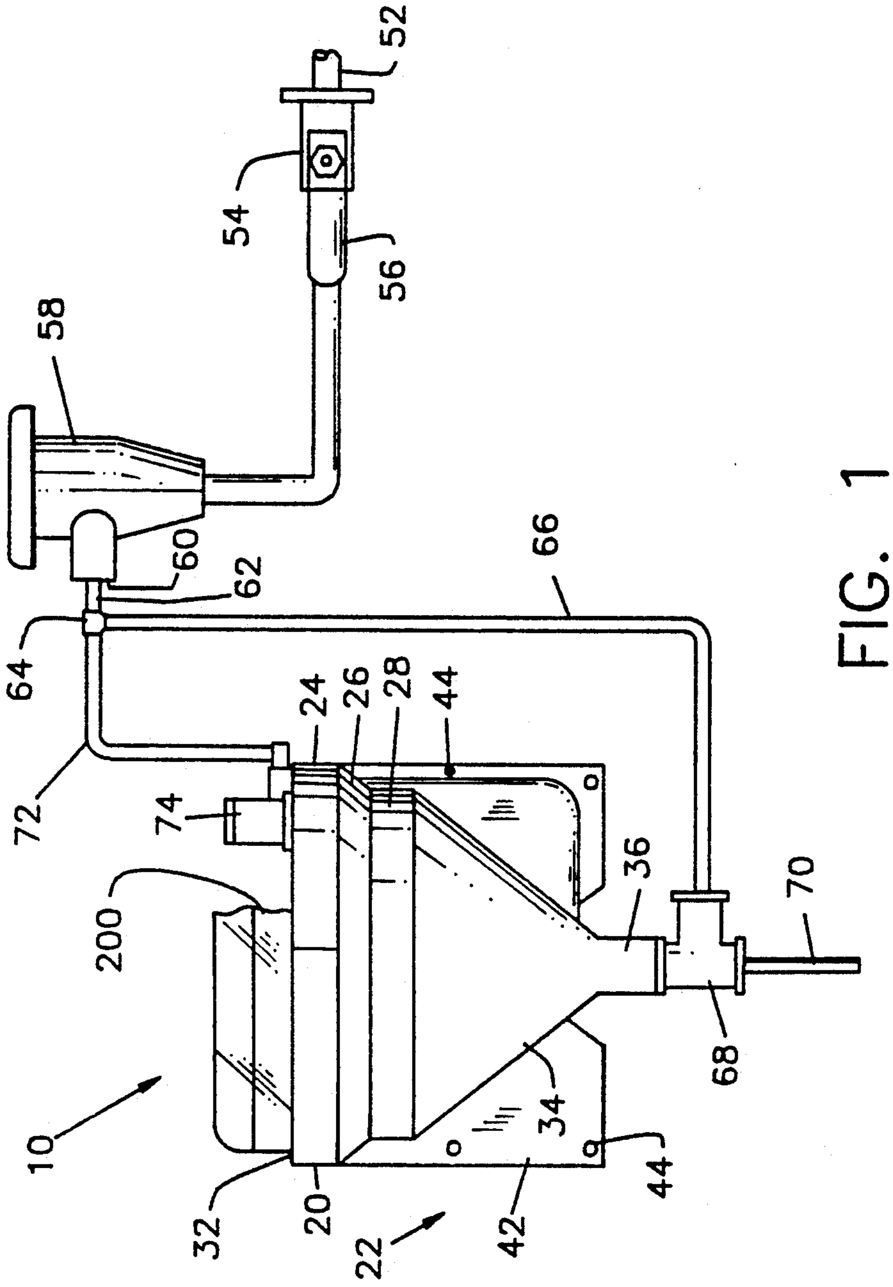
FIG. 1 is a front elevational view of the dispenser in accordance with the present invention, showing a solid chemical capsule loaded therein.

The apparatus of the present invention is applicable in a broad range of processes in which it is desired to accurately and repeatedly dispense a chemical solution in an appropriate concentration for use. In the description which follows, the present invention will be described in connection with a system for providing a dilute concentration of a wash chemical which is ready for immediate use without any further adjustment.

Referring to the figures, there is illustrated one preferred embodiment of the dispensing system 10 in accordance with the present invention. Generally, dispensing system 10 includes a housing 20 having an upper portion 22 formed by an upper generally cylindrical wall 24, an intermediate tapered wall 26 and a lower generally cylindrical wall 28. Together, walls 24, 26 and 28 define an inner cavity 30 which is sized and shaped to receive and support an inverted capsule 200 of a solid-form wash chemical 210. Capsule 200 may be inserted into inner cavity 30 through an open end 32 and, depending on its size, may protrude from the upper portion 22 of the housing. Below upper portion 22, housing 20 tapers inwardly to define a frusto-conically shaped collection portion 34, the lower terminus of which includes an outlet 36 through which a solution of wash chemical may be dispensed from the housing. A partition 38 having a plurality of relatively large openings 40 extends across an intermediate region of collection portion 34 to trap any large chunks of wash chemical 210 which may have fallen out of capsule 200 so that they do not obstruct outlet 36, while enabling the wash chemical solution to pass through the collection portion 34 for dispensing. Housing 20 may further include an integrally formed bracket 42 having a plurality of apertures 44 for securing dispensing system 10 to a wall or other support structure within an establishment.

Dispensing system 10 additionally includes a system of conduits for supplying a fluid solvent to dissolve the chemical 210 in capsule 200 as the capsule is supported in housing 20. Where chemical 210 is a water soluble wash chemical, the solvent provided is water at a suitable temperature and pressure for dissolving the wash chemical. This water may be supplied to dispensing system 10 through an inlet pipe 52 connected to the hot water portion of the conventional plumbing system in the establishment. In a typical commercial establishment, the plumbing system supplies hot water at a temperature of about 120°-130° F. and at a pressure of about 35-40 psi. Of course, for temperatures and pressures falling outside of this range, system 10 may be adjusted as described below to dispense a solution having a desired wash chemical concentration.

Inlet pipe 52 may be provided with a valve 54 for stopping and starting the flow of water to dispensing system 10 as desired. Generally, valve 54 may be any type of manually operated valve, such as a conventional on/off ball valve manually operable by a handle 56 as shown. Although less desirable, manually operated valve 54 may be replaced with a solenoid valve which may be manually actuated in a known manner to start and stop the flow of water through inlet pipe 52. Solenoid valves are less desirable because of the dangers associated with having an AC power source in close proximity to the wash sink, or because of the maintenance required for battery operated devices. Alternatively, valve 54 may take the form of other types of known valves, such as a valve timer which allows water to flow through inlet pipe 52 to dispensing apparatus 10 for a predetermined length of time.

Inlet pipe 52 preferably is also provided with an anti-siphoning device, such as vacuum breaker 58, which operates in a known manner to prevent water from flowing in a reverse direction from dispensing apparatus 10 back into the plumbing system of the establishment. The outlet 60 of vacuum breaker 58 includes a pipe 62 which connects to a first branch of a tee fitting 64 for splitting the water supply into two paths, both of which are defined by conduits which typically are smaller in diameter than inlet pipe 52. One path is defined by a conduit 66 which connects a second branch of tee fitting 64 to one branch of a tee fitting 68 which, in turn, is connected in communication with the outlet 36 of housing 20. Another branch of tee fitting 68 may include a conduit 70 for directing the solution dispensed from system 10 to a utilization point, such as a sink or an automatic dishwashing machine.

The other water supply path from tee fitting 64 is defined by a conduit 72 which is connected at one end to the third branch of tee fitting 64 and which is connected at another end to a safety ball valve 74. Another conduit 76 may extend through housing 20 to connect the outlet of ball valve 74 to a spray nozzle 78 mounted to partition 38 in axial alignment with inner cavity 30 of housing 20 and oriented such that spray nozzle 78 will direct a spray of water 80 upwardly toward the wash chemical 210 in capsule 200.

Figure 2:
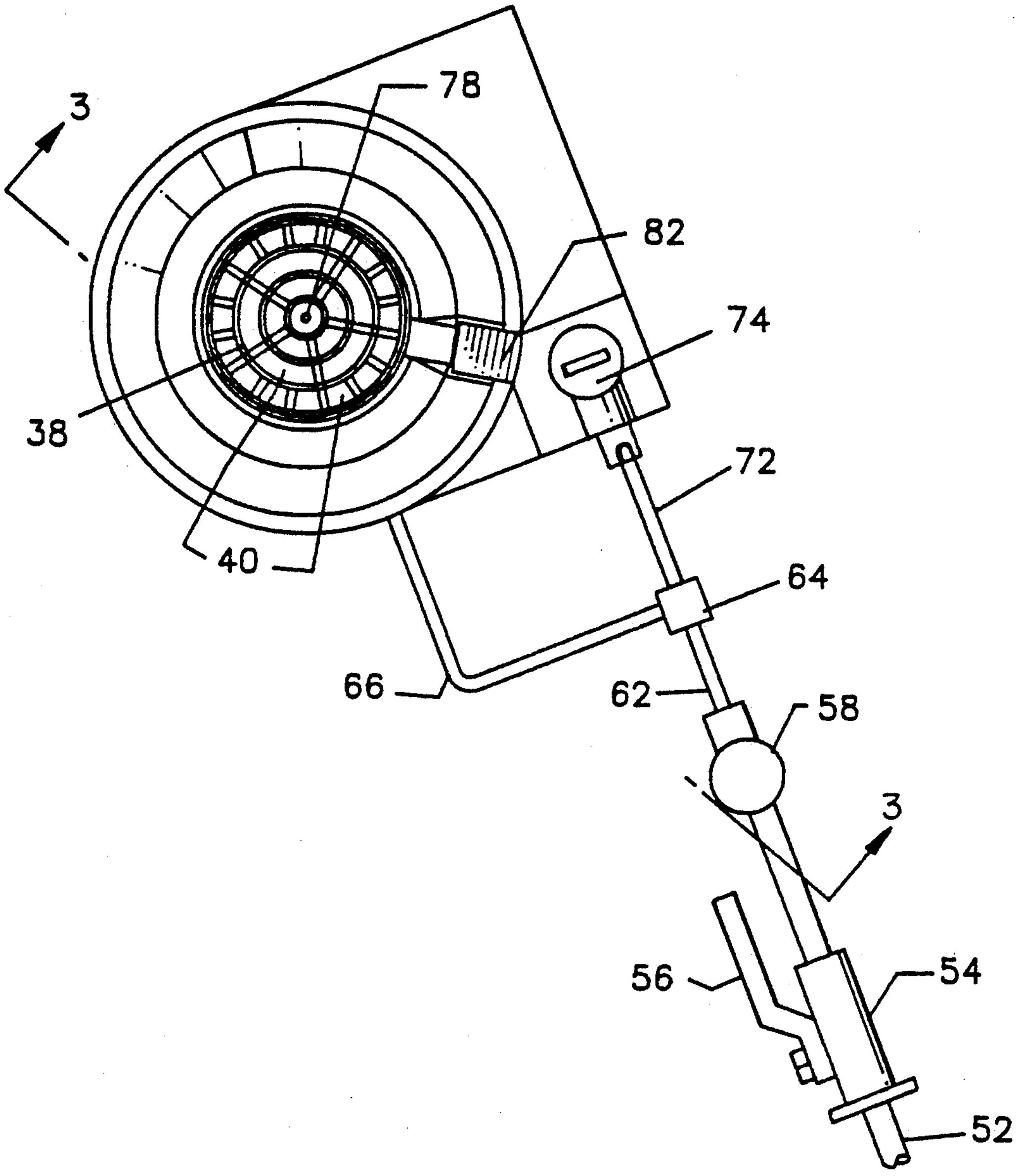
FIG. 2 is a top plan view of the dispenser of FIG. 1 with the capsule removed therefrom.
Figure 3:
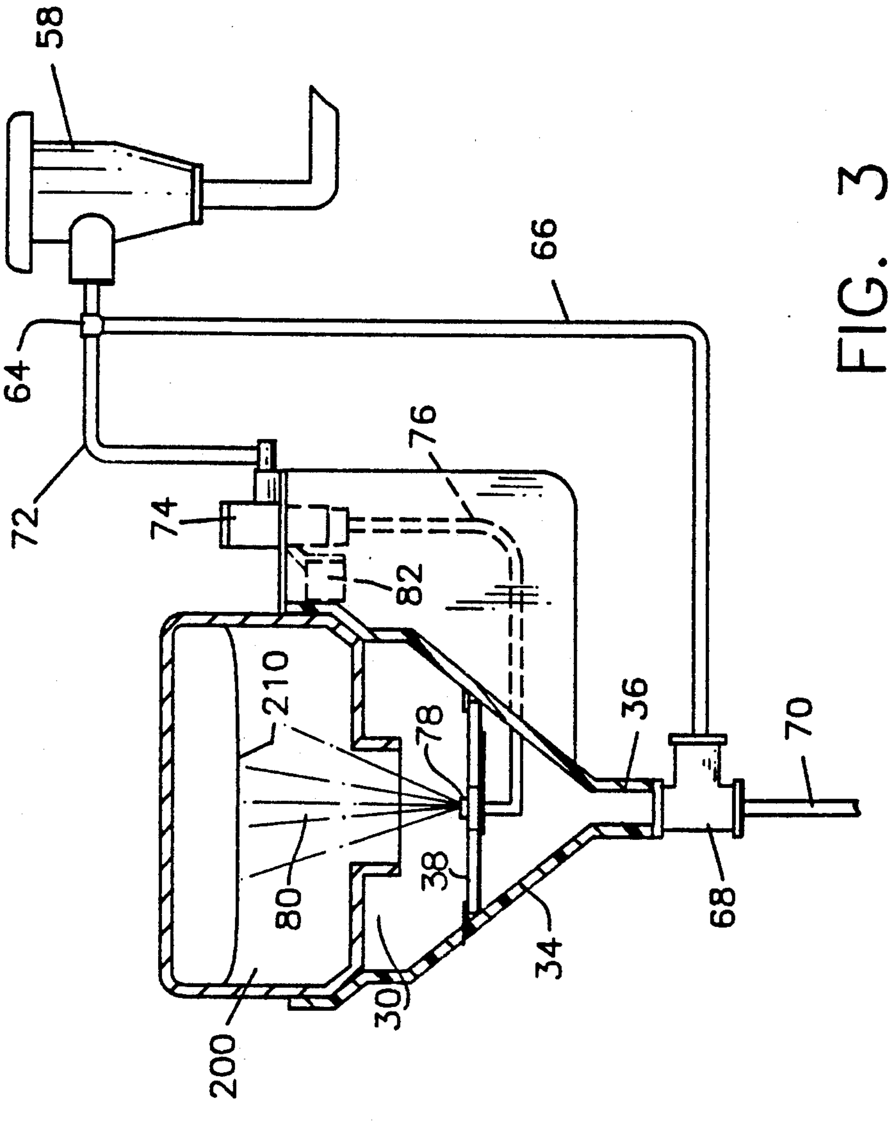
FIG. 3 is a cross-sectional view of the dispenser taken along line III—III of FIG. 2.

Ball valve 74 is a conventional ball valve which prevents the flow of water to spray nozzle 78 in the event a capsule 200 of wash chemical is not in place in housing 20. Ball valve 74 is operated by an arm 82 which is spring biased to the substantially horizontal position shown in FIG. 2. In this position, which will occur when there is no capsule 200 of wash chemical in place in housing 20, ball valve 74 is in a closed condition which prevents the flow of water to spray nozzle 78. As a capsule 200 of wash chemical is inserted into housing 20, however, arm 82 will be pivoted downwardly to the substantially vertical position shown in FIG. 3, placing ball valve 74 in an open condition so that water can flow therethrough to spray nozzle 78.

Figure 4:
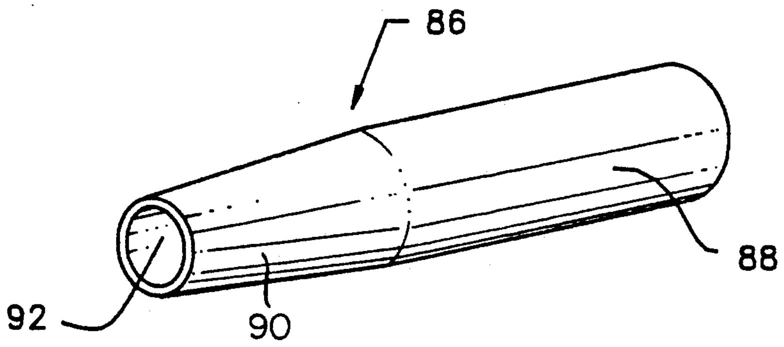
FIG. 4 is a perspective view of a flow-restricting tip having an orifice of a fixed size as used in the present invention.
Figure 5:
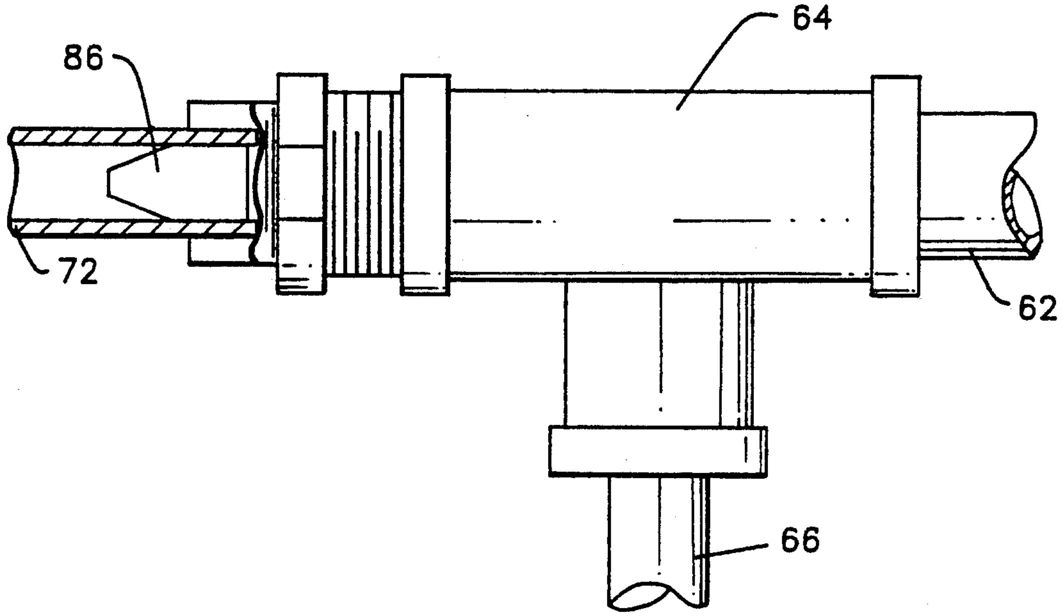
FIG. 5 is an enlarged, partial, front elevational view of the dispenser shown in FIG. 1, partially broken away to show the flow-restricting tip in an inlet conduit.
Figure 6:
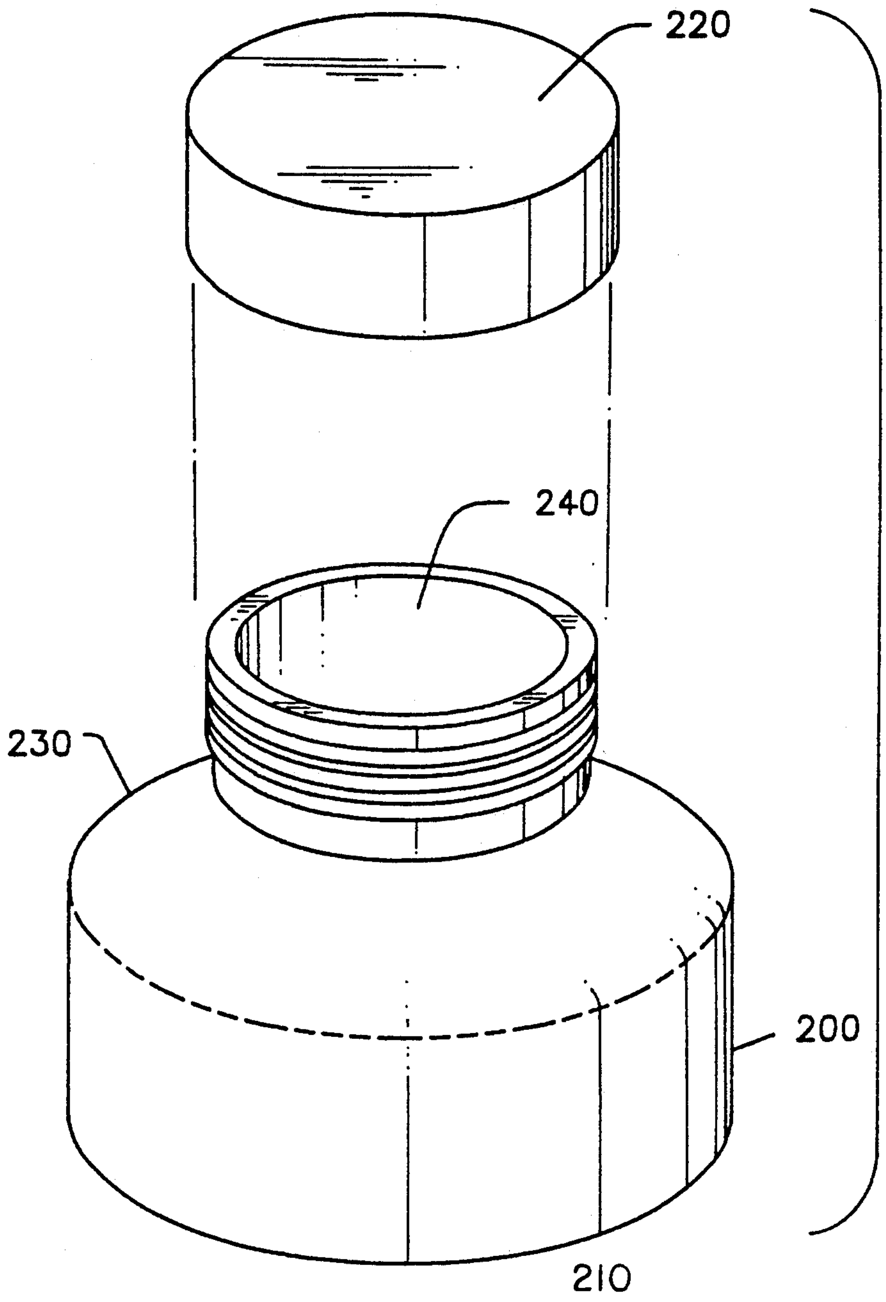
FIG. 6 is an exploded perspective view of a solid chemical capsule as used with the present invention.

In order to control the force of water spray 80 and thus the rate at which the solid wash chemical 210 is dissolved, a regulating device is provided in conduit 72 for regulating the rate of water flow to spray nozzle 78. In one arrangement, regulation may be provided by a conventional needle valve (not shown) which can be readily adjusted by manually turning a knob to alter the flow rate of the water flowing to spray nozzle 78. Generally speaking, the ease of adjustment which these needle valves provide is undesirable since it makes it easy for an operator to tamper with the flow rate once it has been set to an optimum position. Accordingly, regulators which produce a fixed flow rate which cannot be easily changed are preferred. One such flow regulator is the fixed orifice tip 86 shown in FIG. 4. Tip 86 includes a cylindrical portion 88 having an outer diameter which is sized to fit snugly within conduit 72 and an inner diameter which is only slightly smaller than the inner diameter of conduit 72, and a tapered portion 90 which terminates at the end of tip 86 with an orifice 92 having a fixed inner diameter which is significantly smaller than the inner diameter of conduit 72. Referring to FIG. 5, tip 86 may be press fit into an end of conduit 72, typically that end by which conduit 72 is connected to tee fitting 64. A ferrule and compression fitting (not shown) which are assembled around conduit 72 to connect conduit 72 to tee fitting 64 will hold tip 86 in this assembled position. By selecting a tip 86 having an orifice 92 of an appropriate diameter, the water flow through spray nozzle 78 can be adjusted to a rate which will place wash chemical 210 into solution at a desired concentration. For example, Table I shows the effect of the orifice diameter 92 on the dilution ratio for a conventional solid-form wash chemical, such as the TOPAZ, SILVER BULLET and BRAVADO solid detergents available from Sanolite Corporation of Brooklyn, New York, the assignee of the present application. The table reflects a water flow rate of gallon/minute through the tip. Of course, orifice sizes other than those shown can be used to optimize the concentration of the wash chemical in solution in order to achieve desired results.

TABLE I

| Orifice Size | Ratio | Oz./Gal. | dl/l |
|---|---|---|---|
| .187 | 2:1 | 64 | 5.00 |
| .128 | 3:1 | | |
| .070 | 4:1 | 32 | 2.50 |
| .052 | 6:1 | 21 | 1.64 |
| .040 | 9:1 | 14 | 1.90 |
| .035 | 12:1 | | |
| .028 | 20:1 | | |
| .023 | 32:1 | 4 | 0.31 |
| .020 | 42:1 | | |
| .014 | 64:1 | 2 | 0.16 |
| .010 | 128:1 | 1 | 0.08 |

Dispensing system 10 is installed by mounting housing 20 via bracket 42 to a wall or other support structure and connecting inlet pipe 52 to the hot water portion of the establishment's plumbing system. A tip 86 having an orifice 92 appropriately sized to yield a desired wash chemical concentration is assembled in conduit 72 so that the tapered portion 90 faces downstream, i.e. so that the water flowing in conduit 72 will enter tip 86 through cylindrical portion 88 and exit through orifice 92 in tapered portion 90. After installation, a capsule 200 containing a block of solid wash chemical 210 is loaded into dispensing system 10 by removing cap 220 and placing capsule 200 in an inverted position into inner cavity 30 of housing 20. In this position, the shoulder 230 of capsule 200 will rest upon tapered wall 26 of housing 20 and the mouth 240 of capsule 200 will be axially aligned over spray nozzle 78 such that wash chemical 210 will be in direct line with the spray nozzle for impingement by water spray 80.

Dispensing system 10 can be used to fill a vessel of any size with a dilute solution of wash chemical which is ready for immediate use. To begin dispensing, handle 56 is turned to place valve 54 in an open condition, whereby hot water will flow from the plumbing system of the establishment through valve 54 and vacuum breaker 58 to tee fitting 64. At this point, the flow of water will be divided into two paths. One portion of the water will flow through conduit 66 to tee fitting 68 at the dispensing end of housing 20. The other portion of the water will flow through tip 86 in conduit 72 and then through open ball valve 74 to spray nozzle 78, which will direct a spray of water 80 at the exposed surface of wash chemical 210 to place same in solution. The concentration of the wash chemical 210 in the solution will be determined by the rate of water flow to spray nozzle 78 and, hence, the pressure with which water spray 80 impacts wash chemical 210. The concentrated solution of wash chemical will then drop under the influence of gravity through openings 40 in partition 38 to collection portion 34 of housing 20. As the concentrated solution passes through outlet 36 into tee fitting 68, it will be combined with and diluted by the water entering tee fitting 68 through conduit 66 so that a solution of the wash chemical having a preferred concentration for immediate use is dispensed. When the desired volume of the dilute wash chemical solution has been dispensed, handle 56 is turned to a position in which valve 54 is closed, thereby stopping the dispensing action. Thus, regardless of the volume needed, whether to fill a single pot, a bucket or the entire sink, the chemical solution will always be dispensed in an appropriate concentration for immediate use without the need for any further adjustment in concentration.

In the event it is determined that the concentration of the dispensed solution is too weak for the intended washing operation, tip 86 can be removed from conduit 72 and replaced with a tip having a larger orifice 92 so that there will be a greater water flow to spray nozzle 78 and an increased solution rate for wash chemical 210. At the same time, an increased rate of water flow through tip 86 will result in a concomitant decrease in the water flow through conduit 66 to tee fitting 68 so that the concentrated solution exiting collection portion 34 through outlet 36 will be diluted to a lesser extent as it is dispensed from system 10, thus resulting in an overall increase in the concentration of the dispensed solution. By similar mechanisms, replacing tip 86 with a tip having a smaller orifice 92 will decrease the concentration of the solution dispensed.

Although the invention herein has been described with reference to particular embodiments, it is to be understood that these embodiments are merely illustrative of the principals and applications of the present invention. For example, the chemical need not be in the form of a solid block, but rather may consist of solid beads or granules of the chemical. In such event, the capsule may be provided with a cap having a plurality of small holes which retain the chemical granules while providing access for the solvent spray. It is therefore to be understood that numerous modifications may be made to the illustrative embodiments and that other arrangements may be devised without departing from the spirit and scope of the present invention as set forth in the appended claims.

I claim:

1. A dispenser for dispensing a chemical solution, comprising a housing having support means for supporting a chemical in solid form, a dispensing outlet, and a collector portion interposed between said support means and said dispensing outlet, supply means for supplying a solvent for the chemical to said housing, spray means for directing a spray of the solvent at the chemical, first conduit means for directing a first portion of the solvent to flow from said supply means to said spray means, second conduit means for directing a second portion of the solvent to flow from said supply means to said dispensing outlet, and control means for controlling the flow of the solvent through said first and second conduit means.

2. The dispenser as claimed in claim 1, further comprising flow restriction means cooperating with said first conduit means for restricting the flow of said first portion of the solvent from said supply means to said spray means.

3. The dispenser as claimed in claim 2, wherein said first conduit means has a first diameter and said flow restriction means comprises a restricting member defining an aperture having a fixed diameter which is less than said first diameter.

4. The dispenser as claimed in claim 1, wherein said support means supports the chemical in a container, said dispenser further comprising safety valve means for terminating the flow of said first portion of the solvent from said supply means to said spray means when said support means is not supporting a container of the chemical.

5. The dispenser as claimed in claim 1, wherein said control means includes supply valve means for simultaneously controlling the flow of the solvent through said first and second conduit means.

6. A dispensing apparatus for dispensing a chemical solution, comprising a chemical in solid form, a housing having support means for supporting the chemical, a dispensing outlet, and a collector portion interposed between said support means and said dispensing outlet, supply means for supplying a solvent for the chemical to said housing, spray means for directing a spray of the solvent at the chemical, first conduit means for directing a first portion of the solvent to flow from said supply means to said spray means, second conduit means for directing a second portion of the solvent to flow from said supply means to said dispensing outlet, and control means for controlling the flow of the solvent through said first and second conduit means.

7. The dispensing apparatus as claimed in claim 6, wherein said supply means is connected to a plumbing system in an establishment for supplying water to said housing.

8. The dispensing apparatus as claimed in claim 6, further comprising flow restriction means cooperating with said first conduit means for restricting the flow of said first portion of the solvent from said supply means to said spray means.

9. The dispensing apparatus as claimed in claim 8, wherein said first conduit means has a first diameter and said flow restriction means comprises a restricting member defining an aperture having a fixed diameter which is less than said first diameter.

10. The dispensing apparatus as claimed in claim 6, wherein said support means supports the chemical in a container, said dispenser further comprising safety valve means for terminating the flow of said first portion of the solvent from said supply means to said spray means when said support means is not supporting a container of the chemical.

11. The dispensing apparatus as claimed in claim 6, wherein said control means includes supply valve means for simultaneously controlling the flow of the solvent through said first and second conduit means.

12. A method for dispensing a chemical solution, comprising the steps of:

providing a chemical in solid form, supplying a solvent for said chemical, spraying a first portion of said solvent at said chemical to form an initial solution of said chemical and said solvent having a starting concentration of said chemical, combining said initial solution with a second portion of said solvent to form a final solution of said chemical and said solvent having a concentration of said chemical less than said starting concentration, and dispensing said final solution.

13. The method as claimed in claim 12, wherein said supplying step includes the steps of:

defining a first flow path for said first portion of said solvent, defining a second flow path for said second portion of said solvent, providing a plurality of restricting members, each restricting member defining an aperture having a fixed diameter different than said fixed diameters of the other restricting members, selecting one of said restricting members having an aperture of a selected fixed diameter, and interposing said one of said restricting members in said first flow to thereby control flow of said first portion of said solvent during said spraying step.

* * * * *